US012764051B2

(12) United States Patent
An

(10) Patent No.: US 12,764,051 B2
(45) Date of Patent: Oct. 13, 2026

(54) SYSTEM AND METHOD FOR PARALLEL RF TRANSCEIVER TESTING AND CHARACTERIZATION

(71) Applicant: Texas Instruments Incorporated, Dallas, TX (US)

(72) Inventor: Xiaobo An, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 363 days.

(21) Appl. No.: 18/619,920

(22) Filed: Mar. 28, 2024

(65) Prior Publication Data

US 2025/0310232 A1 Oct. 2, 2025

(51) Int. Cl.
*H04L 43/55* (2022.01)

(52) U.S. Cl.
CPC .................................... *H04L 43/55* (2022.05)

(58) Field of Classification Search
CPC ...................................................... H04L 43/55
See application file for complete search history.

(56) References Cited

U.S. PATENT DOCUMENTS

2019/0190624 A1* 6/2019 Kyosti ................. H04B 7/0617
2019/0356396 A1* 11/2019 Kyosti ................. H04B 7/0617

* cited by examiner

*Primary Examiner* — Natasha W Cosme
(74) *Attorney, Agent, or Firm* — Ronald O. Neerings; Charles F. Koch

(57) ABSTRACT

A test system includes a test instrument with a signal terminal, a splitter having a splitter input connected to the signal terminal and multiple splitter outputs, multiple test channels, each including a socket with a socket terminal connected to a respective one of the splitter outputs to couple a transceiver terminal of an installed electronic device under test (DUT) to the respective splitter output, and a controller configured to operate the test instrument to concurrently test transceiver circuits of the installed DUTs at respective unique subcarriers of an OFDM signal at the signal terminal.

20 Claims, 10 Drawing Sheets

1000

SYSTEM AND METHOD FOR PARALLEL RF TRANSCEIVER TESTING AND CHARACTERIZATION

BACKGROUND

Testing radio frequency (RF) transceiver circuit operation is an important aspect of integrated circuit manufacturing to ensure proper operation of manufactured electronic devices. RF transceiver testing can also be beneficial during product design validation and manufacturing process development. Parallel testing of multiple devices reduces cost and increases manufacturing throughput and can reduce development time to market. Unlike digital or analog circuit testing, however, manufacturing test systems often have far fewer RF test resources compared with digital test resources and RF measurement hardware is more expensive than digital test equipment. Low parallelism led to lower throughput and hence the higher test cost. Adding an RF switch matrix can allow several devices under test (DUTs) to be tested in series but does not significantly reduce overall test time.

SUMMARY

In one aspect, a test system includes a test instrument having a signal terminal and a splitter having a splitter input connected to the signal terminal of the test instrument and multiple splitter outputs. The system has test channels, each including a socket with a socket terminal connected to a respective one of the splitter outputs to couple a transceiver terminal of an installed electronic device under test (DUT) to the respective splitter output, and a controller configured to operate the test instrument to concurrently test transceiver circuits of the installed DUTs at respective unique subcarriers of an orthogonal frequency-division multiplexing (OFDM) signal at the signal terminal.

In another aspect, a method of fabricating an electronic device includes installing manufactured electronic devices in respective sockets with a transceiver circuit of each respective electronic device connected to a respective splitter output of a splitter and operating a single test instrument to concurrently test the transceiver circuits of the installed electronic devices at respective unique subcarriers of an OFDM signal at a signal terminal of the test instrument.

DETAILED DESCRIPTION

Figure 1:
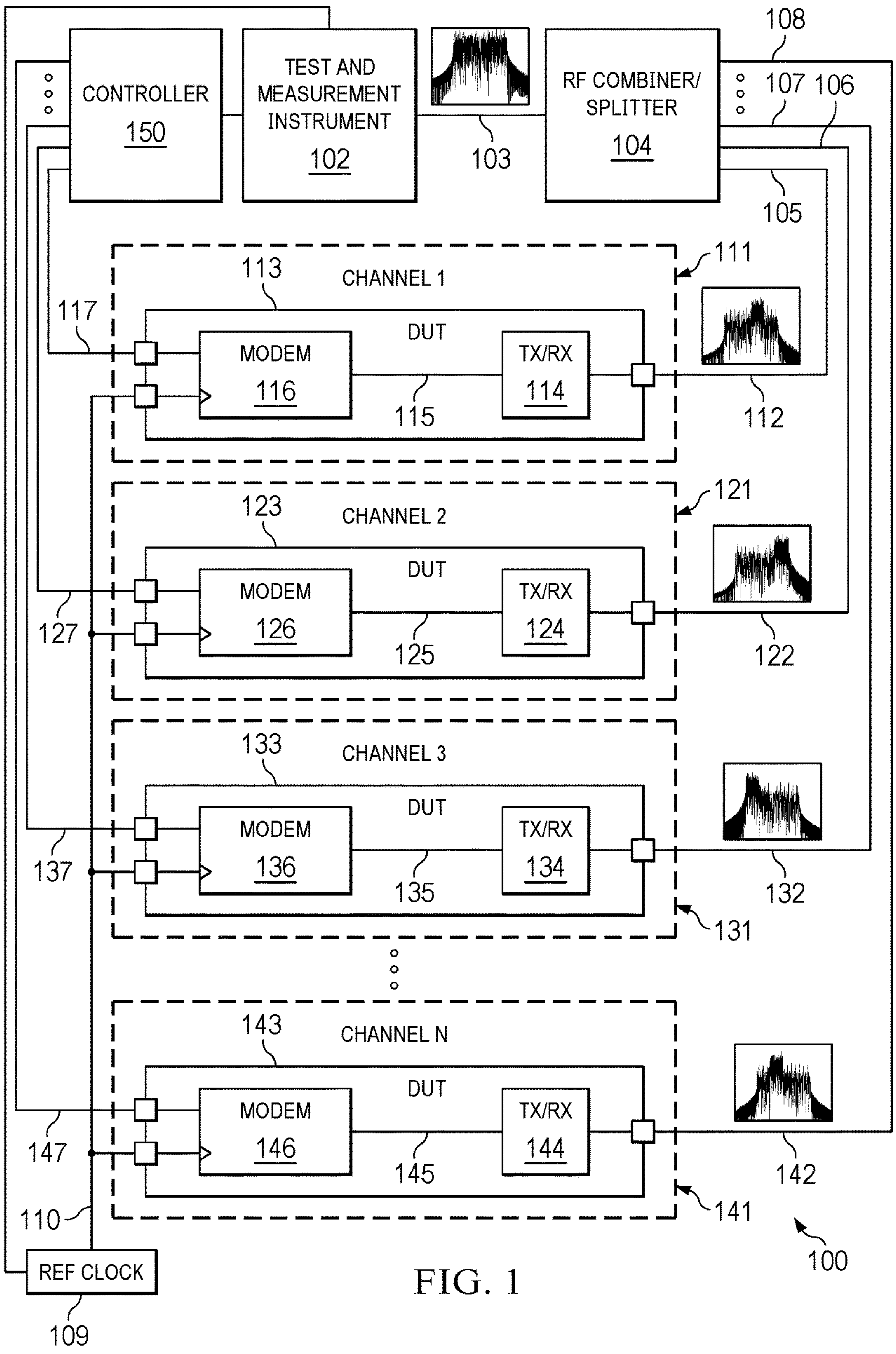
FIG. 1 is a system diagram showing a parallel test system with a single test instrument and an RF splitter for parallel testing of RF transceivers of DUTs having integrated device modems.

In the drawings, like reference numerals refer to like elements throughout, and the various features are not necessarily drawn to scale. Also, the term "couple" or "couples" includes indirect or direct electrical or mechanical connection or combinations thereof. For example, if a first device couples to or is coupled with a second device, that connection may be through a direct electrical connection, or through an indirect electrical connection via one or more intervening devices and connections. One or more operational characteristics of various circuits, systems and/or components are hereinafter described in the context of functions which in some cases result from configuration and/or interconnection of various structures when circuitry is powered and operating. The example structures include layers or materials described as over or on another layer or material, which can be a layer or material directly on and contacting the other layer or material where other materials, such as impurities or artifacts or remnant materials from fabrication processing may be present between the layer or material and the other layer or material. Unless otherwise stated, "about," "approximately," or "substantially" preceding a value means+/−10 percent of the stated value. One or more structures, features, aspects, components, etc., may be referred to herein as first, second, third, etc., for ease of description in connection with a particular drawing, where such are not to be construed as limiting with respect to the claims. The various disclosed structures and methods of the present disclosure may be beneficially applied to an electronic devices, manufacturing, testing, and/or operating an electronic device such as an integrated circuit. While such examples may be expected to provide various improvements, no particular result is a requirement of the present disclosure unless explicitly recited in a particular claim.

FIG. 1 shows a parallel test system 100 with a single test instrument 102 for parallel testing RF DUTs (e.g., labeled "TEST AND MEASUREMENT INSTRUMENT" in FIG. 1). The test instrument 102 has a signal terminal 103 adapted to receive RF signals on multiple subcarriers of an orthogonal frequency domain multiplexed (OFDM) spectrum that are transmitted by tested DUTs during parallel transceiver transmit testing, and to transmit RF signals on the OFDM subcarriers to the tested DUTs during RF transceiver received testing. Any suitable test instrument 102 can be used, such as a radio frequency signal analyzer capable of analyzing specific sub-carrier signals of an OFDM or other suitably modulated signal at the signal terminal 103 for testing transmit operation of tested DUTs, as well as the capability to provide an OFDM output signal at the signal terminal 103 for testing DUT receive operation. In certain implementations, moreover, the test instrument 102 can include multiple devices, such as one device for receiving and analyzing an OFDM signal in order to test the transmit operation of installed DUTs and a second device for transmitting an OFDM signal to test the receive operation of installed DUTs.

The test system 100 in FIG. 1 is configured for parallel testing of RF transceivers of DUTs having integrated device modems. The system 100 includes an RF splitter 104 (e.g., labeled "RF COMBINER/SPLITTER"), which may also be referred to as a power divider, power splitter, power combiner or a "splitter or combiner", and is referred to hereinafter as a splitter. The splitter 104 has a splitter input and N splitter outputs 105-108, where N is an integer greater than 1 and can operate as an RF splitter and/or as an RF combiner for respective receive and transmit testing of RF transceiver DUTs even though referred to as a "splitter". The splitter input is connected to the signal terminal 103 of the test instrument 102. The RF splitter 104 in one example is a passive component or system with a transmission line connection to the splitter input and N ports connected to the splitter outputs to couple electromagnetic power of the splitter input to the respective splitter outputs 105-108. The RF splitter 104 can include one or more directional couplers, hybrid couplings, coupled transmission lines, waveguide designs, or other coupling structures to combine RF DUT signals from the splitter outputs 105-108 to the splitter input and the signal terminal 103 of the test instrument 102 for DUT transmit testing and/or to couple the power of an RF signal transmitted by the test instrument 102 to the signal terminal 103 and the splitter input to the splitter outputs 105-108 for DUT receive testing. In one example, the ports or splitter outputs 105-108 can be isolated from one another. The RF splitter 104 allows concurrent use of the signal RF at the splitter input by the parallel tested DUTs for receive testing and use by the test instrument 102 of the combination of the RF signals from the DUTs during DUT transmit testing.

The test system 100 has a reference clock 109 with a clock output 110 that provides a shared clock signal for use by DUTs and other circuitry of multiple test channels. The splitter 104 can be connected by wired or wireless connections to the test channels. The example system has N=4 test channels including a first test channel 111 (e.g., labeled "CHANNEL 1" in FIG. 1), a second test channel 121 (labeled "CHANNEL 2"), a third test channel 131 (labeled "CHANNEL 3"), and a fourth test channel 141 (labeled "CHANNEL N"). In other examples, more or fewer channels can be used in a given system implementation. Each test channel 111, 121, 131, and 141 includes a respective transceiver terminal 112, 122, 132, and 142 and a respective socket 113, 123, 133, and 143. The individual sockets 113, 123, 133, and 143 have a socket terminal connected to a respective one of the splitter outputs 105, 106, 107, and 108 to couple the transceiver terminal 112, 122, 132, 142 of an installed electronic DUT to the respective splitter output 105, 106, 107, and 108.

The first test channel 111 in this example accommodates a first DUT in the first socket 113. The first socket 113 in this example includes a first data terminal 117 that is adapted to connect a first data line to a data terminal of the first DUT. As schematically shown in FIG. 1, the DUTs in this example have an internal transceiver circuit 114 (e.g., labeled "TX/RX") with a transmit and receive terminal connected by a transceiver terminal of the first socket 113 to the transceiver terminal 112 of the first test channel 111. The DUT in the first test socket 113 includes an internal connection 115 from the first transceiver circuit 114 to a first modem 116 of the first DUT. The modem 116 is operatively coupled to the transceiver circuit 114 of the first test channel 111. The first modem 116 has a clock input connected to the clock output 110 of the shared reference clock 109, as well as a data terminal connected to the first data terminal 117 of the first socket 113. The other DUT modems have similar operative connections to the transceiver circuit of the respective DUTs and are all connected to the shared system reference clock 109.

The second test channel 121 accommodates a second DUT in the second socket 123. The second socket 123 in this example includes a second data terminal 127 that is adapted to connect a second data line to a data terminal of the second DUT. As schematically shown in FIG. 1, the installed second DUT has an internal transceiver circuit 124 with a transmit and receive terminal connected by a transceiver terminal of the second socket 123 to the transceiver terminal 122 of the second test channel 121. The DUT in the second test socket 123 includes an internal connection 125 from the second transceiver circuit 124 to a second modem 126 of the second DUT. The second modem 126 has a clock input connected to the clock output 110 of the shared reference clock 109, as well as a data terminal connected to the second data terminal 127 of the second socket 123.

The third test channel 131 accommodates a third DUT in the third socket 133. The third socket 133 in this example includes a third data terminal 137 that is adapted to connect a third data line to a data terminal of the third DUT. The third DUT has an internal transceiver circuit 134 with a transmit and receive terminal connected by a transceiver terminal of the third socket 133 to the transceiver terminal 132 of the third test channel 131. The DUT in the third test socket 133 includes an internal connection 135 from the third transceiver circuit 134 to a third modem 136 of the third DUT. The third modem 136 has a clock input connected to the clock output 110 of the shared reference clock 109, as well as a data terminal connected to the third data terminal 137 of the third socket 133.

The final test channel 141 (e.g., the fourth or "Nth" channel "CHANNEL N") accommodates a fourth DUT in the fourth socket 143. The fourth socket 143 has a fourth data terminal 147 adapted to connect a fourth data line to a data terminal of the installed fourth DUT.

The fourth DUT has an internal transceiver circuit 144 with a transmit and receive terminal connected by a transceiver terminal of the fourth socket 143 to the transceiver terminal 142 of the fourth test channel 141. The DUT in the fourth test socket 143 includes an internal connection 145 from the fourth transceiver circuit 144 to a fourth modem 146 of the fourth DUT. The fourth modem 146 has a clock input connected to the clock output 110 of the shared reference clock 109, as well as a data terminal connected to the fourth data terminal 147 of the fourth socket 143.

The system 100 has a controller 150, such as an automatic test equipment (ATE) control processor with analog and/or digital interface circuitry, a programmed processor and associated electronic memory. In one example, a processor of the controller 150 is configured by suitable program instructions to operate the test instrument 102 to concurrently test transceiver circuits 114, 124, 134, 144 of the installed DUTs at respective unique subcarriers of an OFDM signal at the signal terminal 103. In addition, the controller 150 can be configured to operate the DUTs and exchange data with the installed DUTs via the data terminals 117, 127, 137 and 147 and the associated DUT modems 116, 126, 136 and 146. Moreover, the controller 150 in certain examples manages subcarrier assignment for the respective DUTs in order to assign individually unique subcarriers or groups thereof to installed DUTs in the individual test channels 111, 121, 131 and 141.

In the example of FIG. 1, each respective DUT has an internal modem 116, 126, 136, 146. In another example, the DUTs can be transceivers or other electronic devices that do not include an internal modem. In such an example, the system can have system modems associated with the individual test channels and the system modems can be operated by the system controller, as illustrated and described further below in connection with FIG. 3. In certain examples, moreover, the system can include individual test channels that have both system modems as well as direct data terminals for connecting the controller 150 to the system modem and/or to a socket configured for a first type of DUT that includes an internal modem, with the system modem of each test channel operatively connected to a second channel socket configured to receive and test a DUT that does not include an internal modem (e.g., an RF amplifier or other circuit having an RF transceiver to be tested in the system). In other examples, the system 100 can include multiple sockets within each test channel to accommodate concurrent high parallel testing (HPT) of RF performance of different types and forms of packaged electronic devices. In this or other examples, the system 100 can include associated system modems and switching circuits or other electrical connections to allow selective use of any included (e.g., integrated) modem or the system modem for a given test channel with data connection to the controller 150 and with the transceiver of each DUT connected to a corresponding splitter output of the RF splitter 104. These configurations and other variants advantageously facilitate parallel (e.g., concurrent) RF testing of multiple DUTs using a single test and measurement instrument 102.

Figure 2:
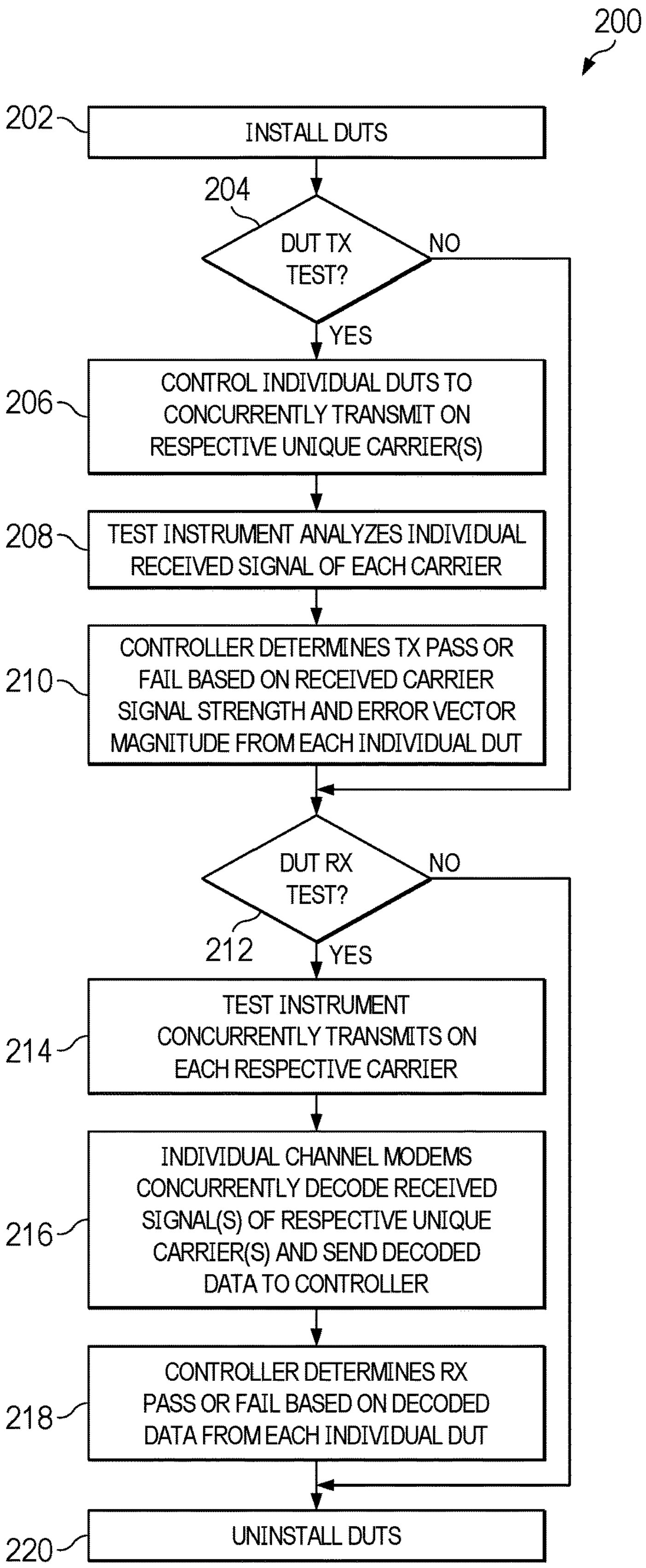
FIG. 2 is a flow diagram of a method of fabricating an electronic device.

Referring also to FIG. 2, the test system 100 implements parallel testing of multiple installed DUTs in automated or semi-automated fashion through suitable programming of the controller 150 and other system equipment, such as automatic installation and removal equipment to installed DUTs in the channel sockets 113, 123, 133, and 143. In another example, the DUTs can be manually installed in the channel sockets 113, 123, 133, and 143 before testing and removed from the channel sockets 113, 123, 133, and 143 after testing.

The system 100 can be configured for single pass or multipass testing of installed DUTs for one or both of transmit and receive operation of the transceiver circuits 114 124, 134, and 144. Where the DUTs include integrated modems (e.g., FIG. 1), the parallel testing can also verify proper operation of the modems 116, 126, 136, and 146. The controller 150 implements selective subcarrier assignment within a bandwidth of interest for a given tested DUT type, for example, in the example OFDM spectrum shown in FIGS. 4 and 5 below. In one DUT transmit testing example, the controller 150 is configured to control the individual DUTs to concurrently transmit on the respective unique subcarriers, and to control the test instrument 102 to analyze individual signals of the respective unique subcarriers received at the signal terminal 103 of the test instrument 102. The controller 150 in one example sends data to the DUT modems 116, 126, 136, and 146 along the respective data terminals 117, 127, 137 and 147 to be transmitted on the assigned subcarrier or group of assigned subcarriers during a given pass of the transmit testing.

In this or another example, the controller 150 is configured to determine a transmit test pass or fail result for each respective DUT based on a received carrier signal strength of the respective unique subcarriers received at the signal terminal 103 of the test instrument 102. The test result in this case indicates whether or not the transmit portion of the respective tested transceivers 114, 124, 134, and 144 exhibits an acceptable transmit signal strength value. The controller 150 in one transmit testing implementation performs a single transmit test pass with each individual DUT assigned a unique subcarrier or group of subcarriers of the OFDM spectrum of interest (e.g., FIG. 5 below), and determines a transmit pass or fail result for each tested DUT based on the single pass transmit test.

In another example, the controller 150 performs multiple passes, with unique subcarrier reassignment (e.g., using a unique single assigned subcarrier or a unique group of two or more assigned subcarriers) for each DUT for each successive test pass. In some multipass implementations, each subcarrier is tested for each DUT, although not a requirement of all possible implementations and fewer than all possible subcarriers can be evaluated for each tested DUT for either or both of transmit and receive testing.

The system 100 can also test the receiver portion of the transceivers 114, 124, 134, and 144 using high parallel single or multipass testing. In one example, the controller 150 is configured to control the test instrument 102 to concurrently transmit on each of the respective unique subcarriers at the signal terminal 103. In this example, the controller 150 controls the modem 116, 126, 136, and 146 of each respective test channel 111, 121, 131, and 141 to concurrently decode received signals of the respective unique subcarriers using the shared signal at the output 110 of the system reference clock 109 and the modems 116, 126, 136, and 146 each send decoded data for each respective unique subcarrier or group of subcarriers to the controller 150. The controller 115 in one example is configured to determine a received test pass or fail result for each respective DUT based on the decoded data for each respective unique subcarrier, for example, based on a number of correctly received data packets based on known transmitted data provided to the modems 116, 126, 136, and 146 by the controller 150.

In one implementation, the controller 150 is configured to operate the test instrument 102 to concurrently test the DUT transceiver circuits 114, 124, 134, and 144 at respective groups of the unique subcarriers of the OFDM signal at the signal terminal 103 in a single pass or multiple passes. In one example, the system implements IEEE 802.11 OFDM testing using 48 virtual sub data channels (subcarriers) in one physical RF channel to provide high parallel testing (HPT) with a modified OFDM, where multiple (e.g., N) DUT RF paths are combined to share the virtual sub data channels/carriers on the same physical RF channel.

In one example, the controller is configured to operate the test instrument 102 to perform multiple test passes using different assigned unique subcarriers or groups thereof for the respective DUTs in each test pass. In these or another example, the controller 150 is configured to operate the test instrument 102 to perform a single test pass using fewer than all of the unique subcarriers for the respective DUTs. In another example, the controller 150 is configured to operate the test instrument 102 to perform multiple test passes using fewer than all of the unique subcarriers for the respective DUTs. The system 100 allows complete subcarrier highly parallel testing of each DUT if desired and can implement less than full subcarrier testing for each DUT in order to enhance throughput and reduce testing time for a batch of DUTs.

FIG. 2 shows a method 200 of fabricating an electronic device according to other aspects. The method 200 includes installing DUTs in respective sockets 113, 123, 133, and 143 at 202 in FIG. 2 with a transceiver circuit 114, 124, 134, and 144 of each respective electronic device connected to a respective splitter output 105, 106, 107, and 108 of a splitter 104 in the test system 100 of FIG. 1. The method 200 includes operating a single test instrument 102 to concurrently test the transceiver circuits 114, 124, 134, and 144 of the installed electronic device DUTs at respective unique subcarriers of an OFDM signal at the signal terminal 103 of the test instrument 102.

Figure 3:
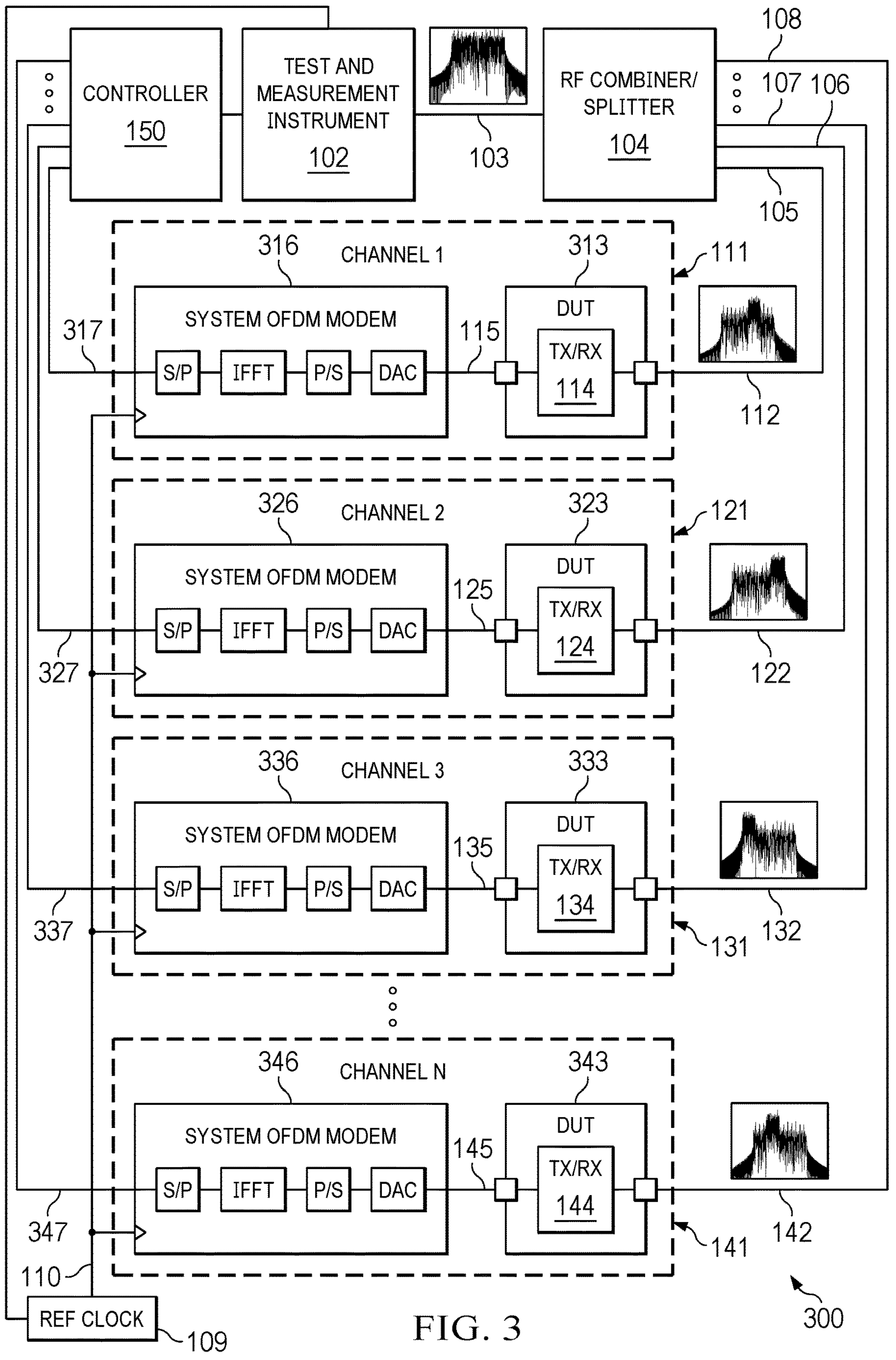
FIG. 3 is a system diagram showing another parallel test system with a test instrument and an RF splitter as well as multiple system channel OFDM modems for parallel testing of RF transceiver DUTs.

In the illustrated example, the controller 150 determines at 204 whether DUT transmit testing is desired. If so (YES at 204), the controller 150 implements automated transmit testing at 206, 208 and 210 in FIG. 2. The transmit testing in one example includes the controller 150 operating the integrated DUT modems modem 116, 126, 136, and 146 that are integrated (e.g., included) in the respective DUTs and operatively coupled to each respective transceiver circuit 114, 124, 134, and 144 while concurrently testing the transceiver circuits 114, 124, 134, and 144 of the installed electronic device DUTs. In another example, the controller 150 operates the system modems that are external to the tested DUTs as shown in FIG. 3 below while concurrently testing the DUT transceiver circuits to which the system modems are connected.

At 206 and FIG. 2, the controller 150 controls the individual electronic device DUTs to concurrently transmit on the respective assigned unique subcarriers (single assigned subcarrier or unique assigned group of subcarriers), for example, to transmit data provided by the controller 150 to the respective modems 116, 126, 136, and 146 via the respective data terminals 117, 127, 137 and 147. At 208, the controller 150 controls the single shared test instrument 102 to analyze the individual signals of the respective unique subcarriers received at the signal terminal 103 of the test instrument 102. At 210 in the illustrated example, the controller 150 determines a transmit test pass or fail result for each respective electronic device DUT based on both a received carrier signal strength of the respective unique subcarriers received at the signal terminal 103 of the test instrument 102 and also on a decoded error vector magnitude (EVM) parameter of the respective unique subcarriers received at the signal terminal 103 of the test instrument 102 (e.g., power amplitude and modulation quality). The controller 150 in one example computes an error vector magnitude parameter based on a distance between an ideal target constellation (e.g., in an I-Q plane) which represents the magnitude of a modulation quality error.

In one example, the controller 150 compares the individual received carrier signal strength of each assigned subcarrier at 210 with a corresponding pass or fail threshold value (e.g., a power amplitude threshold) and compares the decoded EVM parameter of the respective unique subcarriers received at the signal terminal 103 to a predetermined EVM threshold (e.g., a modulation quality threshold). In this example, the controller 150 determines a transmitted test fail result if the received signal strength is less than the power amplitude threshold or if the decoded EVM is equal to or greater than the predetermined modulation quality threshold, and otherwise the controller 150 determines that the corresponding DUT to which that subcarrier was assigned passed the transmit test. Where a group of two or more subcarriers are currently assigned to a given DUT, the controller 150 in one example determines a transmit test pass fail result if any of the received signal strengths of the assigned group of subcarriers is below the corresponding power amplitude test threshold or if any of the decoded EVM parameter is equal to or greater than the predetermined modulation quality threshold. The testing at 206-210 can be repeated for further passes in certain implementations, for example, with subcarrier reassignment to the respective DUTs between successive passes to perform multiple test passes using different assigned unique subcarriers or groups thereof for the respective electronic device DUTs in each test pass.

If no DUT transmit testing is performed (NO at 204) or after all desired single or multipass transmit testing is completed, the method 200 proceeds to 212 in FIG. 2, where the controller 150 determines whether DUT receive testing is desired. If not (NO at 212), the DUTs are uninstalled or otherwise removed from the sockets 113, 123, 133, and 143 at 220 and the method 200 can be repeated for another set of DUTs.

If receive testing is desired (YES at 212), the controller 150 implements automated receive testing of the DUT transceiver circuits 114, 124, 134, and 144 at 214, 216 and 218 in FIG. 2. The receive testing in one example includes single pass testing. In another implementation, the receive testing can be performed in multiple passes, for example, with subcarrier reassignment between test passes. In one example at 214, the controller 150 controls the test instrument 102 to concurrently transmit on each of the respective assigned unique subcarriers at the signal terminal 103.

At 216, the controller 150 controls the integrated DUT modem 116, 126, 136, and 146 of each respective test channel 111, 121, 131, and 141 (or the connected system modems as shown in FIG. 3 below) to concurrently decode received signals of the respective unique subcarriers. Also at 216, the modems 116, 126, 136, and 146 send decoded data for each respective unique subcarrier to the controller 150 for evaluation.

At 218, the controller 150 determines a received test pass or fail result for each respective electronic device based on the decoded data for each respective unique subcarrier. In one example, the controller 150 compares the decoded data packets from the modems 116, 126, 136, and 146 with data packets provided to the test instrument 1024 transmission at the respective subcarrier and determines the number of incorrectly decoded data packets from the modems 116, 126, 136, and 146 at 218. In this example, the controller 150 determines a received test fail result at 218 for each respective DUT and assigned subcarrier (or group of subcarriers) if the number of incorrectly decoded data packets is equal to or greater than a predetermined test threshold, and otherwise determines a received test pass result.

The controller 150 can be programmed or otherwise configured to implement different test pass or fail criterion for either or both transmit and receive testing. The receive testing at 214-218 can be repeated for further passes in certain implementations, for example, with subcarrier reassignment to the respective DUTs between successive test passes to perform multiple test passes using different assigned unique subcarriers or groups thereof for the respective electronic device DUTs in each test pass. Once all the desired receive testing is performed, the tested DUTs are uninstalled at 220 from the respective test sockets 113, 123, 133, and 143.

FIG. 3 shows another parallel test system 300 with the single test instrument 102 and the RF splitter 104 with an example set of N=4 channels 111, 121, 131, and 141 substantially as described above, except that the tested DUTs include a corresponding transceiver circuit 114, 124, 134, and 144 as described above. In this example, however, the transceivers are tested using system OFDM modems 316, 326, 336, and 346 operatively coupled in the respective channels 111, 121, 131, and 141 for high parallel testing of RF transceiver DUTs, where the modem 316, 326, 336, 346 of each respective test channel 111, 121, 131, and 141 is external to the respective DUT. This system implementation 300 can be used, for example, to test DUTs that do not include an internal modem. In another example, the test system 300 can be used to test transceiver circuits 114, 124, 134, and 144 of DUTs that have internal modems, and it is desired to separately test the transceiver circuits using the external system modems 316, 326, 336, and 346 of the respective test channels. In the illustrated system 300, the test channels 111, 121, 131, and 141 include a respective channel socket 313, 323, 333, and 343 with a corresponding socket terminal 115, 125, 135, and 145 to connect the corresponding transceiver circuit 114, 124, 134, 144 to the respective system channel modems 316, 326, 336, and 346 as shown in FIG. 3. The system includes individual channel data terminals 317, 327, 337, and 347 that connect the controller 150 to the respective data terminals of the system modems 316, 326, 336, and 346.

Figure 4:
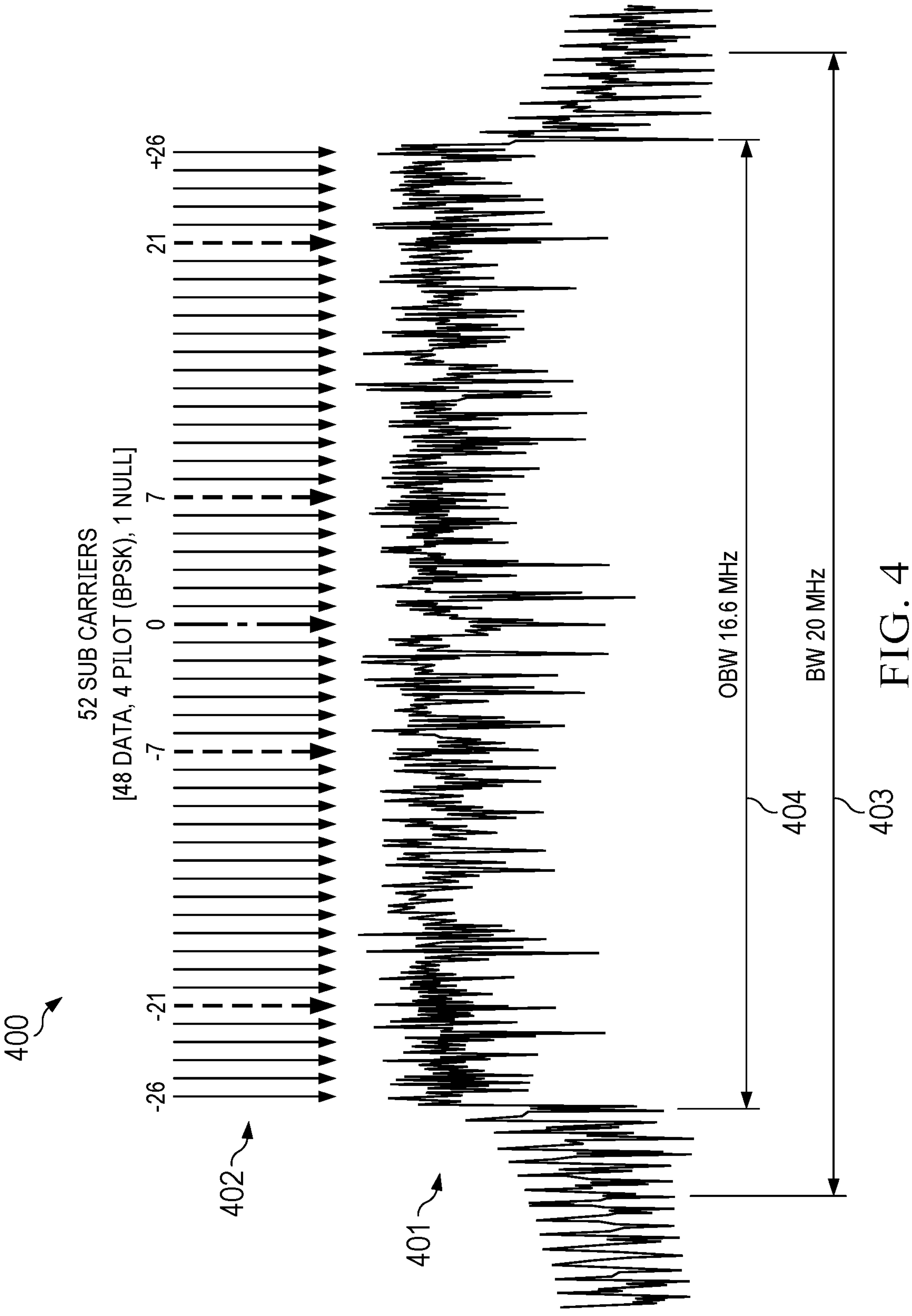
FIG. 4 is a partial signal diagram of an example OFDM spectrum with 52 subcarriers including 48 data subcarriers and 4 pilot subcarriers.
Figure 5:
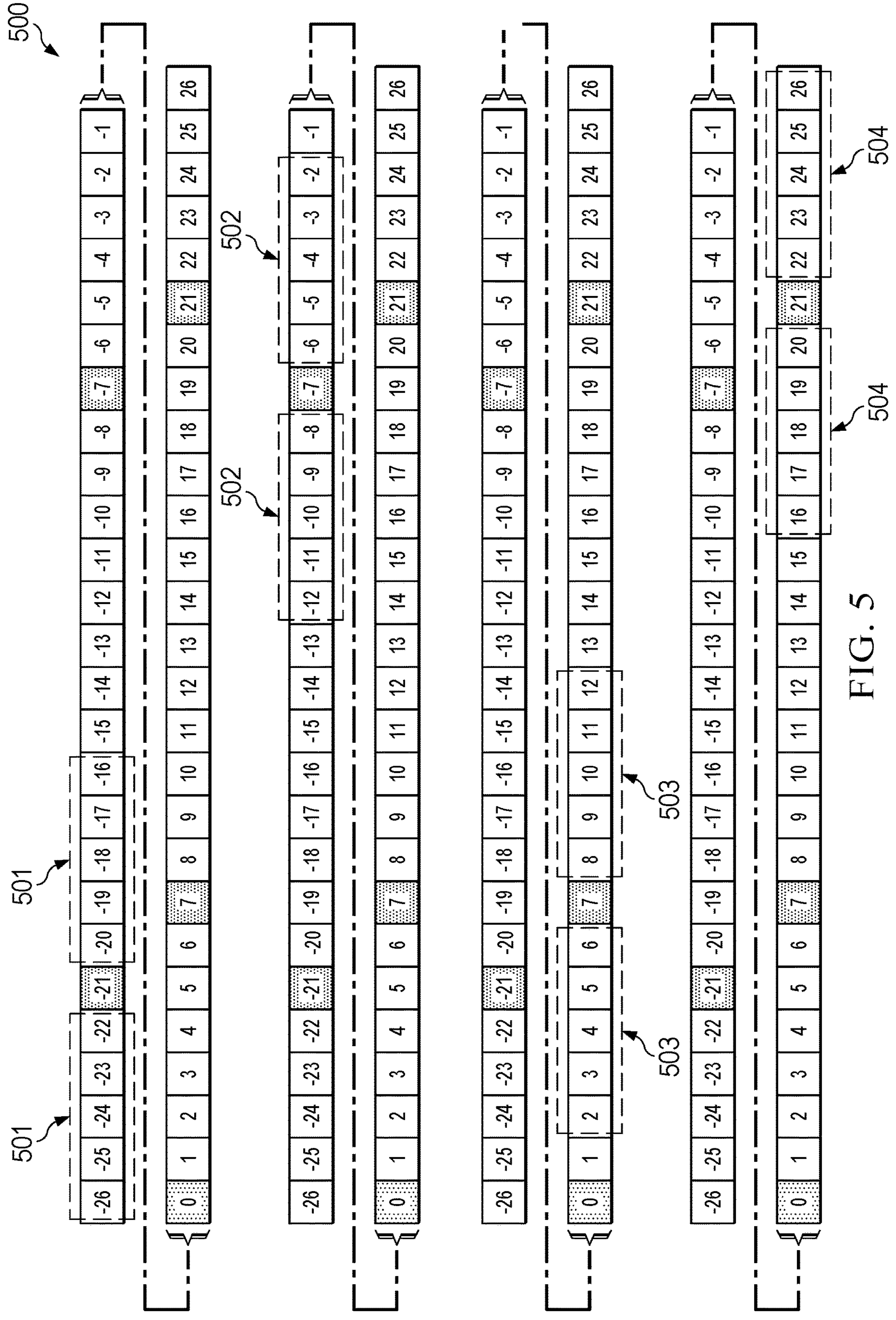
FIG. 5 shows an example subcarrier assignment with unique groups of ten data subcarriers assigned to each of four tested DUTs.
Figure 6:
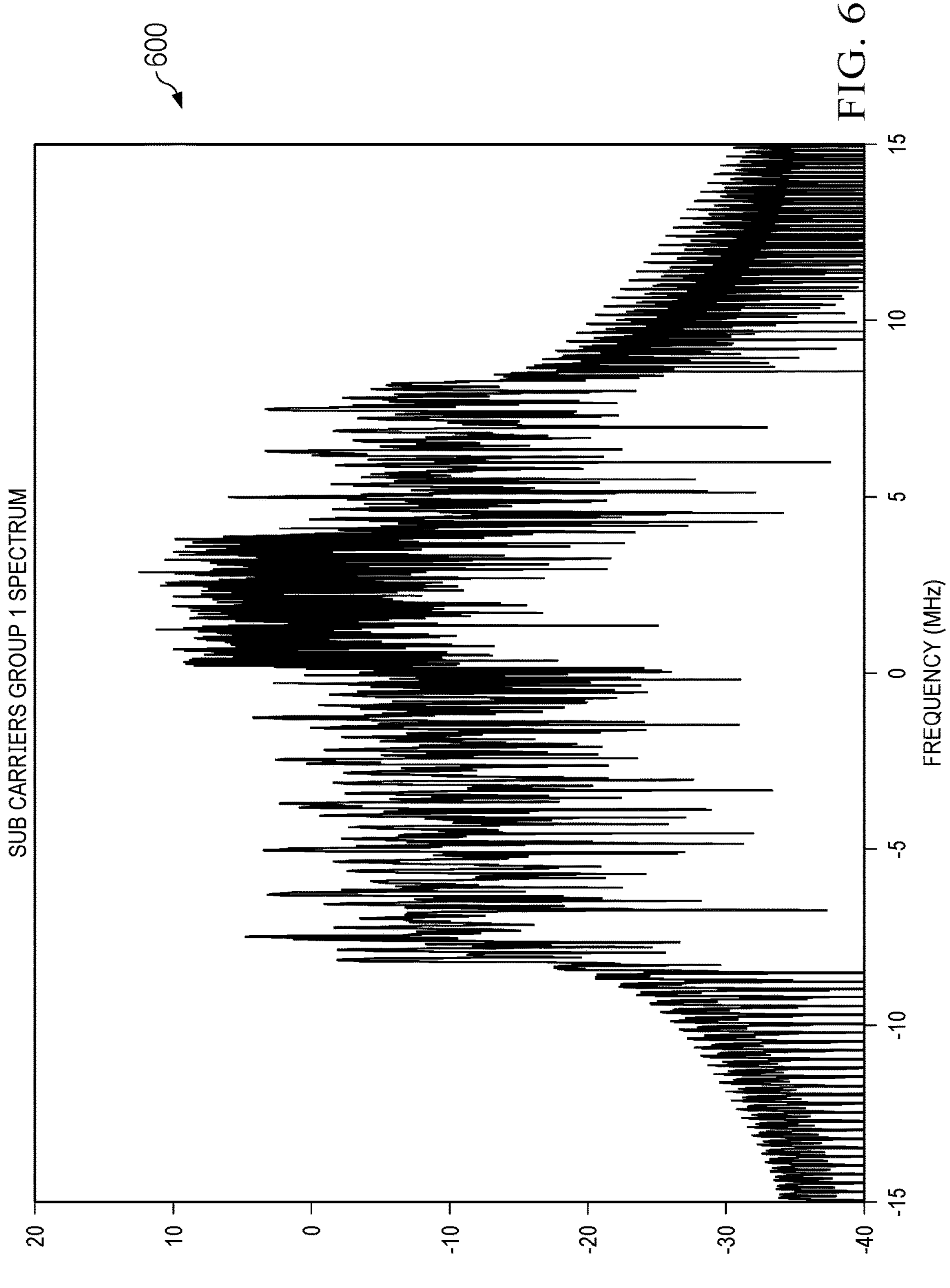
FIGS. 6-9 show respective transceiver transmit test waveforms generated by the four tested DUTs at the respective assigned unique subcarrier groups.

Referring also to FIGS. 4 and 5, FIG. 4 shows a partial signal diagram 400 of an example OFDM spectrum signal waveform or spectrum 401 with 52 subcarriers labeled 402 respectively designated +1 through +26 and −1 through −26, with a null subcarrier indicated as "0", and four pilot (BPSK) subcarriers including 48 data subcarriers and 4 pilot subcarriers +7, +21, −7, and −21. The example OFDM spectrum 401 extends in a bandwidth 403 of 20 MHz that includes a 16.6 MHz orthogonal bandwidth 404. The test systems 100 and 300 and the method 200 can operate in any bandwidth of interest using corresponding subcarriers for high parallel RF testing, of which the spectrum 400 in FIG. 4 is a non-limiting illustrative example. FIG. 5 shows an example subcarrier assignment diagram 500 with unique groups 501, 502, 503, and 504 of ten data subcarriers assigned to each of four tested DUTs in the example test systems 100 and 300 above using N=4 for one example test pass for receive or transmit testing.

The example channel assignments shown in FIG. 5 can be used by the controller 150 for a single pass test of four DUTs, or for a first pass of a multipass implementation, with the subcarrier assignments changed for successive test passes. The first subcarrier group 501 in this example is used for testing a first DUT transceiver circuit 114 in the first channel 111 and includes subcarriers −16, −17, −18, −19, −20, −22, −23, −24, −25, and −26. The controller 150 assigns the second example subcarrier group 502 to the second channel 121 to test the second DUT transceiver circuit 124 in the second channel 121, and includes subcarriers −2, −3, −4, −5, −6, −8, −9, −10, −11, and −12. The controller 150 in this example assigns the third subcarrier group 503 to test the third DUT transceiver circuit 134 of the third channel 131, and includes subcarriers 2, 3, 4, 5, 6, 8, 9, 10, 11, and 12. The fourth subcarrier group 504 in this example is used to test the fourth DUT transceiver circuit 144 of the fourth channel 141, and includes subcarriers 16, 17, 18, 19, 20, 22, 23, 24, 25, and 26. This example grouping utilizes the full capability of the single shared test instrument 102 which can evaluate received signals on each subcarrier for transceiver transmit testing, and also facilitates thorough received testing, in which the test instrument 102 can simultaneously transmit on all the data subcarriers for evaluating decoded data received by the receiver circuits of the tested DUTs in a single or first pass.

In one example, the assigned subcarrier groups are rotated between the channels 111, 121, 131, and 141 for the next pass of a multipass implementation. For example, the controller 151 can implement the second pass by assigning the subcarrier group 501 to the second channel 121, the subcarrier group 502 to the third channel 131, the subcarrier group 503 to the fourth channel 141, and assigning the carrier group 504 to the first channel 111. The rotating of the assignment of the subcarrier groups 501-504 is one example, and any other suitable reassignment algorithm or criterion can be used that assigns unique subcarriers or groups thereof to each channel, with each assigned subcarrier being used by only one of the DUT test channels in a given pass.

The subcarrier assignment groups illustrated in FIG. 5 include groups 501, 502, 503, and 504 of adjacent subcarriers. Adjacency is not required of all possible implementations, and two different channels can be assigned more than one subcarrier that is adjacent to a subcarrier assigned to a different channel. For example, a set of assigned groups can be interleaved, such that each subcarrier assignment group has no adjacent subcarriers within the group.

Figure 7:
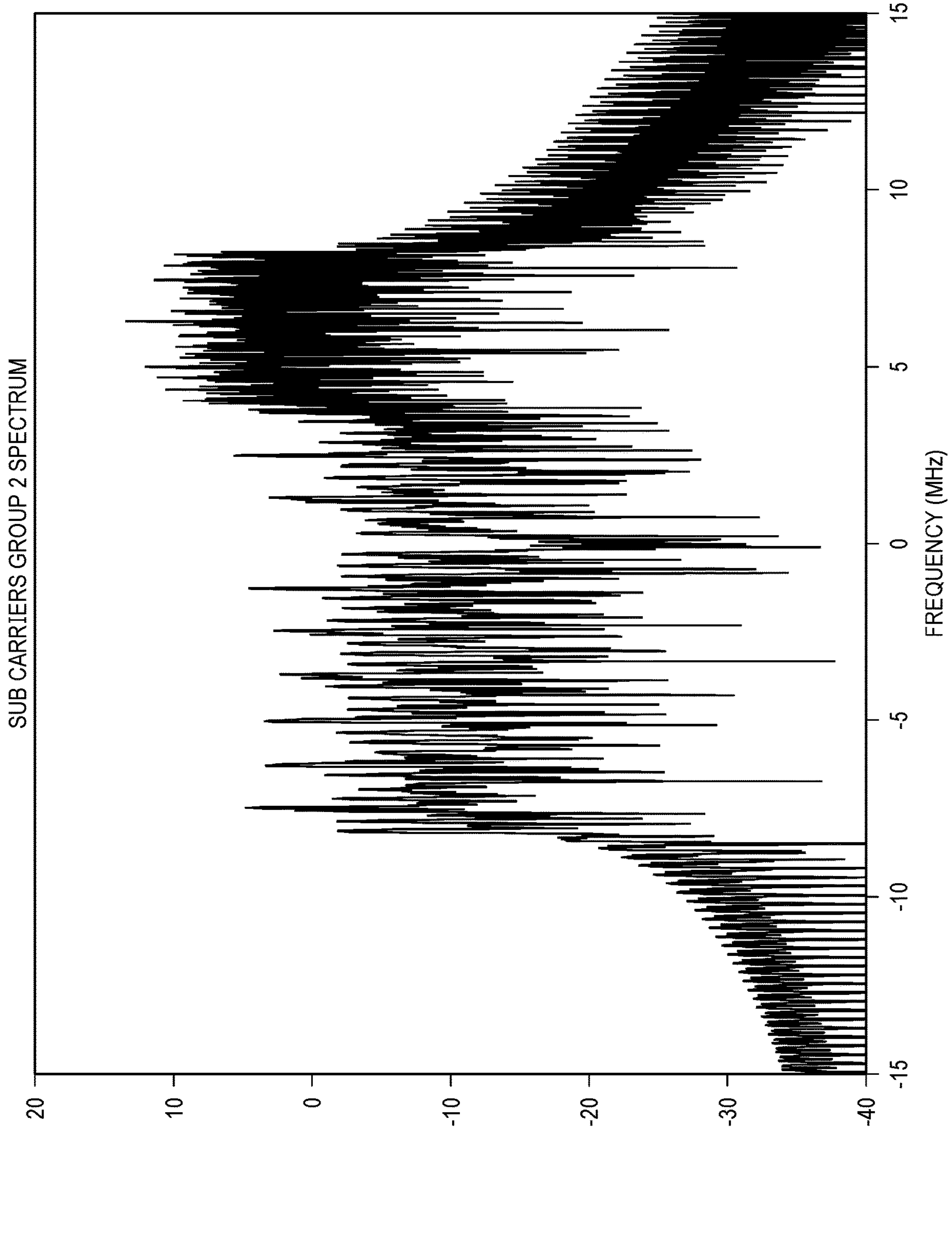
Figure 8:
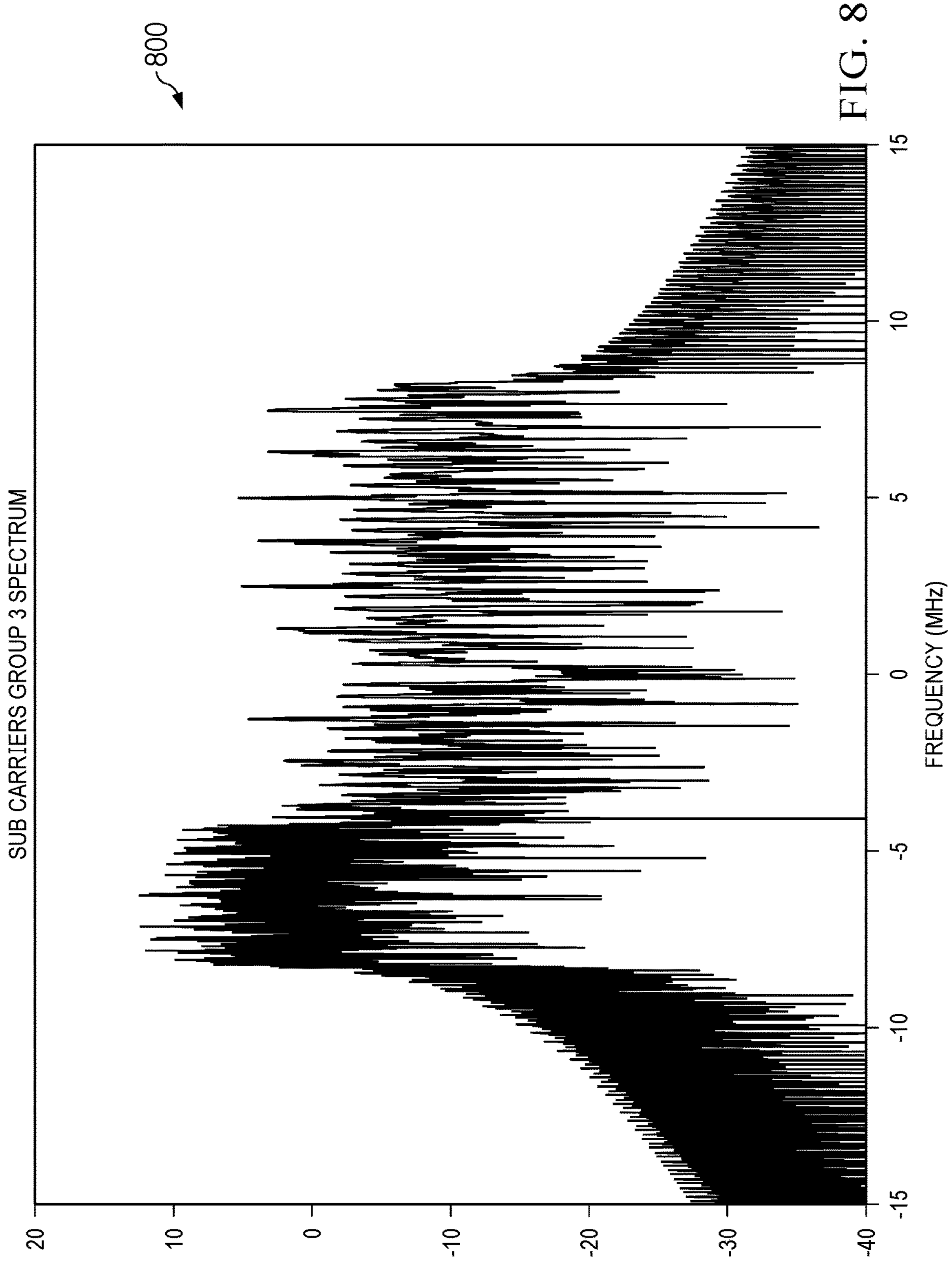
Figure 9:
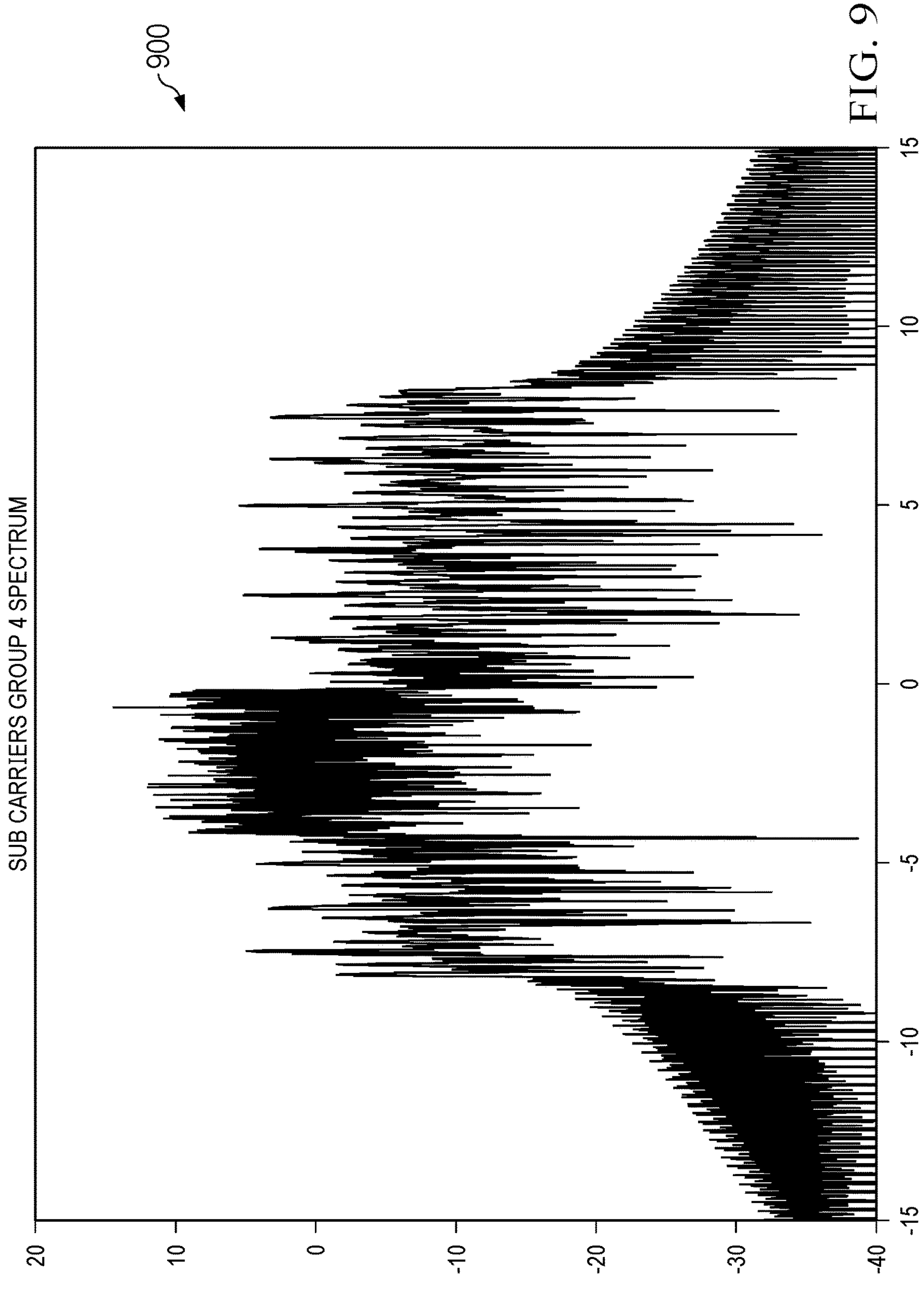
Figure 10:
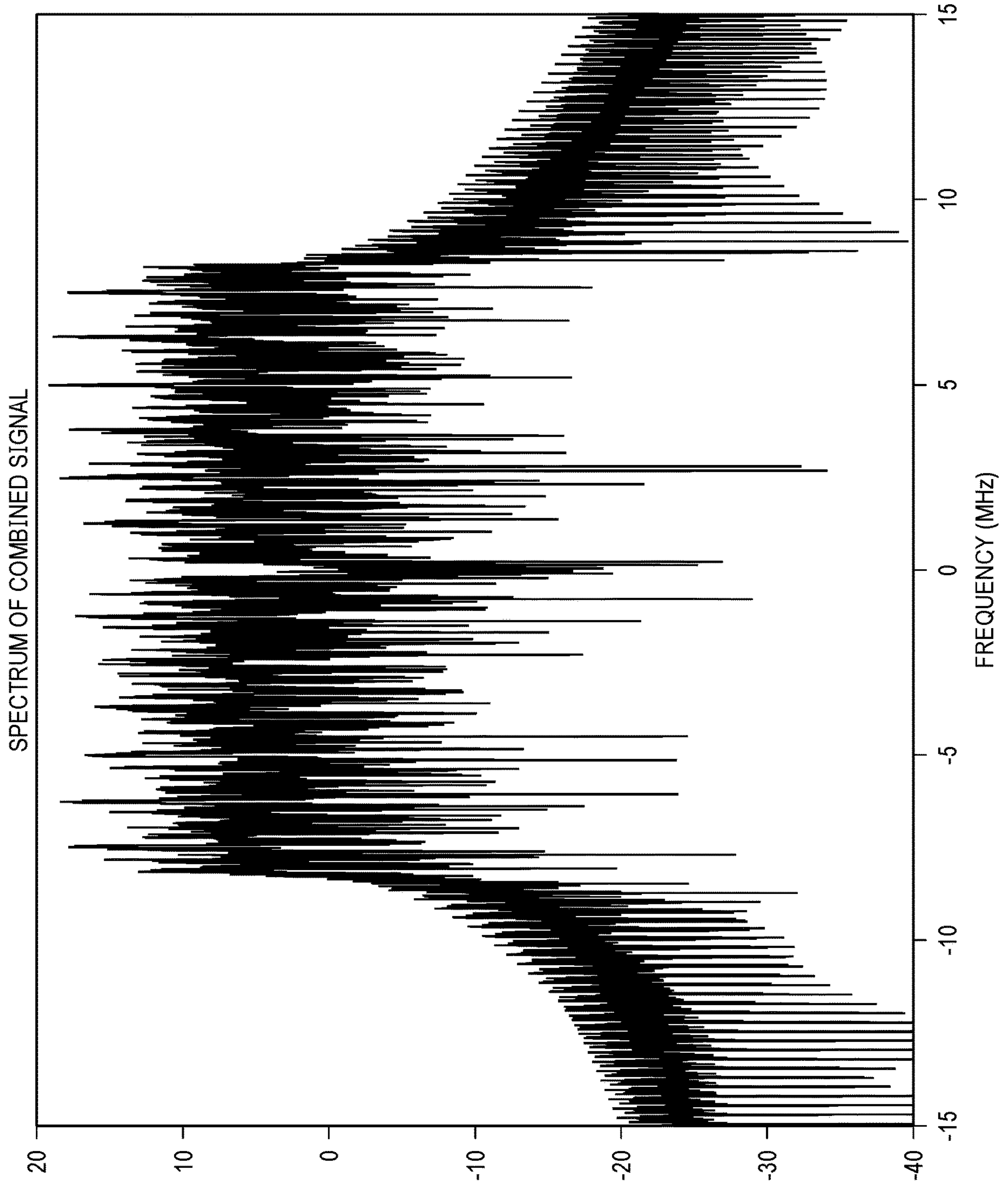
FIG. 10 shows a received composite OFDM signal received by the test instrument during parallel transmit testing of the four DUTs.

FIGS. 6-9 show respective MATLAB code simulation transceiver transmit test waveforms 600, 700, 800, and 900 generated by the example four tested DUTs at the respective assigned unique subcarrier group examples 501-504 of FIG. 5 in an example third pass. In this example third test pass, controller 150 has assigned the third subcarrier group 503 for testing the transceiver circuit 114 of the first test channel 111 (e.g., subcarriers 2, 3, 4, 5, 6, 8, 9, 10, 11, and 12), and the simulated waveform 600 shows the first group spectrum transmitted by the DUT of the first channel 111. The second test channel 121 in this third pass has been assigned the fourth subcarrier group 504 (e.g., subcarriers 16, 17, 18, 19, 20, 22, 23, 24, 25, and 26), and the simulated waveform 700 and FIG. 7 shows the second group spectrum transmitted by the DUT of the second channel 121. The simulated waveform 800 and FIG. 8 shows the third group spectrum transmitted by the DUT of the third channel 131, which has been assigned the first subcarrier group 501 by the controller 150 (e.g., subcarriers −16, −17, −18, −19, −20, −22, −23, −24, −25, and −26), and the waveform 900 in FIG. 9 shows the fourth group spectrum transmitted by the DUT of the fourth channel 141, which has been assigned the second subcarrier group 502 (e.g., subcarriers −2, −3, −4, −5, −6, −8, −9, −10, −11, and −12). FIG. 10 shows a received composite OFDM signal 1000 received by the test instrument during parallel transmit testing of the four DUTs. As shown in the waveform 1000, the test instrument 102 receives the full spectrum from the RF combiner/splitter 104 and separately evaluates each subcarrier that has been assigned. This facilitates high parallel testing using a single test instrument 102 for concurrent RF testing without requiring the expense and complexity associated with providing a separate test instrument for each tested DUT. The illustrated example provides multiple virtual sub data channels/carriers by combination in one physical RF channel for use of a single shared test instrument 102 using a modified OFDM implementation. Other frequency division multiplexing implementations are possible in other examples. As discussed above, moreover, the test systems and methods can be used with DUTs with integrated or internal modems, or with DUTs having no modems, with the system including system modems to encode and decode OFDM signals at baseband, where each DUT only uses a certain number of virtual subcarriers as assigned by the controller 150. The tested DUTs in the illustrated example are synchronized using a single shared system clock 109 (e.g., FIG. 1), and the system can include the capability of adjustable delays between channels if helpful. Various examples facilitate sharing expensive test and measurement instrumentation (e.g., test instrument 102) to generate and analyze OFDM signals, where a single shared spectrum analyzer can analyze all DUT transmit signals in parallel and report the received signal power and error vector magnitude (EVM) for each respective subcarrier.

The described systems and methods can be used for testing any type of RF integrated circuit, including without limitation Bluetooth and Wi-Fi microcontrollers (MCUs) having an RF transceiver, an RF transmitter, an RF receiver, or other RF circuit to be tested in parallel with other DUTs.

Moreover, the system and method examples can be used for parallel testing of different DUT types, for example, to test RF transceivers of different types of integrated circuits installed in corresponding channel sockets. The described examples can advantageously increase the throughput of ATE testing and bench validation and reduce the ATE test cost and bench validation cycle time, to facilitate faster time to market and cost effective automated testing in manufacturing production. Various system implementations can include load board structures designed to include or provide connections for an RF combining/split module, as well as suitable software on the test instruments to support the per sub-channel reporting, analysis, etc. Moreover, portions of the described systems and methods can be incorporated into test instrumentation, such as providing OFDM-HPT modems inside the test instrument 102 to make a high parallel testing equipment for DUTs with only RF transceiver circuitry ((e.g., RF front end amplifiers). The described solutions, moreover, facilitate high parallel test operation for many concurrently tested DUTs, for example, where N can be up to 48 in the example OFDM-HPT implementations, where smaller values of N (e.g., 4, 8, etc.) still provide advantages with respect to cost savings, reduced testing time, faster time to market, etc.

Modifications are possible in the described examples, and other implementations are possible, within the scope of the claims.

What is claimed is:

1. A test system, comprising:
a test instrument having a signal terminal;
a splitter having a splitter input connected to the signal terminal of the test instrument and an integer number N splitter outputs, N being greater than 1;
test channels, each test channel including a socket with a socket terminal connected to a respective one of the splitter outputs to couple a transceiver terminal of an installed electronic device under test (DUT) to the respective splitter output; and
a controller configured to operate the test instrument to concurrently test transceiver circuits of the installed DUTs at respective unique subcarriers of an OFDM signal at the signal terminal.

2. The test system of claim 1, wherein the controller is configured to operate a modem operatively coupled the transceiver circuit of each respective test channel.

3. The test system of claim 2, wherein the modem of each respective test channel is included in the respective DUT.

4. The test system of claim 2, wherein the modem of each respective test channel is external to the respective DUT.

5. The test system of claim 1, wherein the controller is configured to:
control the individual DUTs to concurrently transmit on the respective unique subcarriers;
control the test instrument to analyze individual signals of the respective unique subcarriers received at the signal terminal of the test instrument; and
determine a transmit test pass or fail result for each respective DUT based on a received carrier signal strength of the respective unique subcarriers received at the signal terminal of the test instrument and on a magnitude of a decoded error vector magnitude parameter of the respective unique subcarriers received at the signal terminal of the test instrument.

6. The test system of claim 5, wherein the controller is configured to:
control the test instrument to concurrently transmit on each of the respective unique subcarriers at the signal terminal;
control a modem of each respective test channel to concurrently decode received signals of the respective unique subcarriers and to send decoded data for each respective unique subcarrier to the controller; and
determine a received test pass or fail result for each respective DUT based on the decoded data for each respective unique subcarrier.

7. The test system of claim 1, wherein the controller is configured to:
control the test instrument to concurrently transmit on each of the respective unique subcarriers at the signal terminal;
control a modem of each respective test channel to concurrently decode received signals of the respective unique subcarriers and to send decoded data for each respective unique subcarrier to the controller; and
determine a received test pass or fail result for each respective DUT based on the decoded data for each respective unique subcarrier.

8. The test system of claim 1, wherein the controller is configured to operate the test instrument to concurrently test transceiver circuits of the installed DUTs at respective groups of the unique subcarriers of the OFDM signal at the signal terminal.

9. The test system of claim 1, wherein the controller is configured to operate the test instrument to perform multiple test passes using different assigned unique subcarriers for the respective DUTs in each test pass.

10. The test system of claim 1, wherein the controller is configured to operate the test instrument to perform a single test pass using fewer than all of the unique subcarriers for the respective DUTs.

11. A method of fabricating an electronic device, the method comprising:
installing manufactured electronic devices in respective sockets with a transceiver circuit of each respective electronic device connected to a respective splitter output of a splitter;
operating a single test instrument to concurrently test the transceiver circuits of the installed electronic devices at respective unique subcarriers of an OFDM signal at a signal terminal of the test instrument.

12. The method of claim 11, further comprising operating a modem operatively coupled each respective transceiver circuit while concurrently testing the transceiver circuits of the installed electronic devices.

13. The method of claim 12, wherein the modem is included in the respective electronic device.

14. The method of claim 12, wherein the modem of each respective test channel is external to the respective electronic device.

15. The method of claim 11, comprising:
controlling the individual electronic devices to concurrently transmit on the respective unique subcarriers;
controlling the test instrument to analyze individual signals of the respective unique subcarriers received at the signal terminal of the test instrument; and
determining a transmit test pass or fail result for each respective electronic device based on a received carrier signal strength of the respective unique subcarriers received at the signal terminal of the test instrument and on a magnitude of a decoded error vector magnitude parameter of the respective unique subcarriers received at the signal terminal of the test instrument.

16. The method of claim 15, comprising:

controlling the test instrument to concurrently transmit on each of the respective unique subcarriers at the signal terminal;

controlling a modem of each respective test channel to concurrently decode received signals of the respective unique subcarriers; and determining a received test pass or fail result for each respective electronic device based on the decoded data for each respective unique subcarrier.

17. The method of claim 11, comprising:

controlling the test instrument to concurrently transmit on each of the respective unique subcarriers at the signal terminal;

controlling a modem of each respective test channel to concurrently decode received signals of the respective unique subcarriers and to send decoded data for each respective unique subcarrier to the controller; and determining a received test pass or fail result for each respective electronic device based on the decoded data for each respective unique subcarrier.

18. The method of claim 11, comprising operating the test instrument to concurrently test transceiver circuits of the installed electronic devices at respective groups of the unique subcarriers of the OFDM signal at the signal terminal.

19. The method of claim 11, comprising operating the test instrument to perform multiple test passes using different assigned unique subcarriers for the respective electronic devices in each test pass.

20. The method of claim 11, comprising operating the test instrument to perform a single test pass using fewer than all of the unique subcarriers for the respective electronic devices.

* * * * *